INVENTORS
Wilfrid Lord
Ronald Steele
by Benj. T. Rauber
their attorney

United States Patent Office 3,002,536
Patented Oct. 3, 1961

3,002,536
MECHANICAL BELTING
Wilfrid Lord, Rochdale, and Ronald Steele, Sudden, Rochdale, England, assignors to Dunlop Rubber Company Limited, a company of Great Britain
Filed Jan. 28, 1960, Ser. No. 5,233
Claims priority, application Great Britain Jan. 30, 1959
6 Claims. (Cl. 139—419)

This invention relates to mechanical belting and is concerned with the provision of belts having closed complete edges after cutting from a greater width of belting material.

In the manufacture of belting particularly of the transmission type one method which has been employed consists in building up a laminate comprising wide layers of impregnated textile fabric, consolidating the laminates, by heat and pressure, into a belting structure and then cutting the structure to any required lesser width as required for use.

By this method, however, a cut edge is produced which exposes some of the warp threads in the fabric and these "string" and wrap round the pulleys in use. The cut edges of the belting may be painted or sprayed with solutions or cements to protect them from the ingress of moisture, grit and the like but this treatment does not give sufficient resistance to edge wear or abrasion. Consequently the warp threads in the fabric adjacent the edge of the belting are easily damaged by abrasion and splay out thereby causing rapid wear at the edges of the belt.

Such belting having a cut edge is therefore not very suitable for applications where the belt has to be moved between a loose pulley and a driving pulley by means of the conventional "shifters" or "guide forks." These effect lateral movement by pushing against the edges of the belting, and consequently serious abrasion of the edges soon occurs.

It is an object of the present invention to provide compound weave fabrics in wide widths, suitable for belting, and which may be divided longitudinally by cutting to provide desired narrower widths of belting having edges capable of withstanding abrasion particularly of the type resulting from contact with belt shifters or guide forks.

According to the present invention a divisible belting fabric comprises a plurality of longitudinal compound weave belting portions having weft threads in a plurality of planes, and a plurality of longitudinal dividing portions adapted for cutting longitudinally of the fabric to sever the weft threads and divide the fabric, at least two pairs of warp threads in each dividing portion, said pairs of warp threads being leno woven and said weft threads passing through loops in each of said pairs of warp threads.

Also according to the invention a divisible belting comprises a divisible belting fabric having a plurality of longitudinal compound weave belting portions having weft threads in a plurality of planes, and a plurality of longitudinal dividing portions adapted for cutting longitudinally of the fabric to sever the weft threads and divide the fabric, at least two pairs of warp threads in each dividing portion said pairs of warp threads being leno woven and said weft threads passing through loops in each of said pairs of warp threads, impregnated and covered with an elastomeric material.

Also according to the invention a method of making belting having abrasion-resistant edges comprises weaving a divisible belting fabric having weft threads in a plurality of planes, and a plurality of longitudinal dividing portions adapted for cutting longitudinally of the fabric to sever the weft threads and divide the fabric, at least two pairs of warp threads in each dividing portion, said pairs of warp threads being leno woven and said weft threads passing through loops in each of said pairs of warp threads, tensioning said warp threads to draw together the weft threads from different planes, impregnating and covering the said divisible belting fabric with an elastomeric material, heating the belting under pressure to vulcanise or consolidate the elastomeric material and dividing the belting by cutting so that each cut edge is adjacent a pair of leno woven warp threads.

Fabric in accordance with the invention is manufactured from a warp having a plurality of portions containing the number and type of warp threads required for belting reinforcement separated by portions containing the number and type of warp threads required for the edging strips the width of these portions being such that when they are cut each reinforcement portion has an edging portion of the required construction on each side. The edging portions consist of contiguous warp threads woven in "leno" fashion and hence act as selvedges. These threads are suitably tensioned to bring the weft threads in the dividing portion into one plane and to lock them in position. The locking action is obtained by causing the two "leno" warp threads to be twisted part way around each other before they interlace with each weft thread which in effect passes through the twisted loop.

The method of forming the "leno" edge is well known, the weaving mechanism used for producing it being known as a "split motion" or sometimes as a "centre selvedge motion."

The yarns used for weaving the belting fabric may be for example, cotton, rayon, nylon or polyethylene terephthalate, or a combination thereof. The yarns are woven to produce a compound weave wide-width fabric in which the warp or the weft threads are laid in two or more layers or where the warp threads are loosely bound into the fabric. All the warp and/or weft threads need not necessarily be of the same yarn and that used for the selvedges may be different from that used in the body of the fabric, thus for example nylon warp may be used for the selvedges and cotton warp for the body of the fabric. By "compound weave" fabric is meant a fabric having two or more woven layers combined either by some of the warp threads or by binder threads. Such fabric is also sometimes referred to as "solid woven" fabric. By "wide-width" fabric is intended a fabric containing at least two belting widths and which may be divided to form at least two individual belts. The actual width of such fabric will depend on the width of the finished belt and the number of these widths contained in the woven fabric according to the invention.

The wide-width fabric is woven with dividing sections spaced at predetermined intervals across the width. These sections which contain only weft threads flanked on each side with contiguous warp threads woven in leno fashion, facilitate cutting after processing. Several belting widths may be woven in one wide width, for example three belts each 3 inches wide, three belts each 4 inches wide, and three belts each 5 inches wide (i.e. nine belting widths in all) arranged alternately or in groups as desired. The spaces for dividing the belts add up to about 2 inches giving a total width of woven fabric of about 38 inches. Similar combinations of 3 inch, 4 inch, 5 inch and 6 inch belting sections may also be woven.

When the strips of belting are cut after processing, the locked weft threads prevent the body warp threads from fraying out and these in turn provide a selvedge which will resist abrasion of the edge when in contact with belt shifters or guide forks.

The initial wide-width belting fabric is preferably coated on one or both sides with an elastomeric material, for example natural or synthetic rubber, gutta percha, balata or a plasticised polyvinyl chloride composition. Coating of the fabric may be carried out by spreading or friction calendering with the elastomer in known manner.

The coated fabric is then placed in a belting press and subjected to heat and pressure to consolidate the belting and to vulcanise the elastomeric material if of rubber or the like or to impregnate the fabric if of the reversibly thermoplastic type such as plasticised polyvinyl chloride.

The consolidated wide-width belting is then separated into narrower widths of belting by cutting through the middle of the dividing portions. The belting is finally cut to the required length and the ends fastened by means of fasteners in other known manner to form a complete belt.

The construction of one form of belting fabric and of belting in accordance with the invention will now be described by way of example with reference to the accompanying drawings in which.

Figure 1:
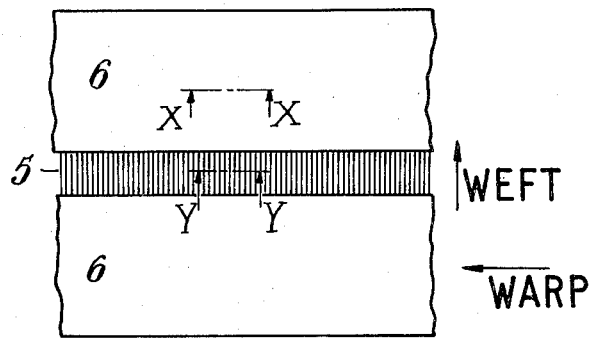
FIGURE 1 is a plan of part of a two ply compound weave fabric having two belting portions divided by weft threads.
Figure 2:
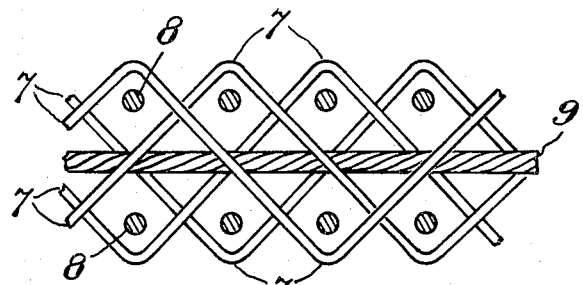
FIGURE 2 shows a section of the belting fabric on a line X—X.
Figure 3:
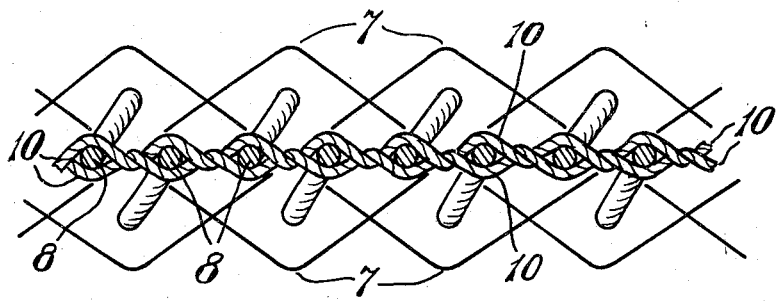
FIGURE 3 shows a section of the belting fabric on a line Y—Y.

Referring to the drawings FIGURE 1 shows part of a two ply compound weave fabric constructed to have nine woven portions 6, each four inches wide separated by dividing portions 5, each 0.25 inch wide and containing only weft threads. These dividing portions add up to a width of two inches forming a total fabric width of 38 inches. FIGURE 2 shows a sectional elevation of the belting fabric on a line X—X in which the woven portions 6, are composed of warp threads 7, interlacing with weft threads 8. Also included in the woven portions are tension cords 9 which lie between the two layers of weft threads 8 and have one tension cord 9 alternating with two warp threads 7. FIGURE 3 shows a sectional elevation of the belting fabric on a line Y—Y showing that along each edge of each woven portion 6 are two threads 10 woven in "leno" fashion and interlacing with all the weft threads 8. These threads 10, are so tensioned that they pull the weft threads 8 into one plane and lock them in position when the fabric is subsequently cut along the dividing portions 5 (FIGURE 1). In FIGURE 3, for clarity, the warp threads 7 are represented by single lines.

The yarns used in the belting fabric described have the following construction. The warp threads 7 consist of 7s/10 cotton and are laid at 40 threads per inch. The tension cords 9 are of 250 denier /8/4 polyethylene terephthalate and there are 20 threads per inch.

The weft threads 8 consist of 7s/5/3 cotton and there are 12 threads per inch.

The "leno" threads 10 are of 840/2 nylon and there are two on each edge of the dividing strip.

In one example of constructing belting from the wide width two ply compound weave fabric constructed as described above, a length of the fabric was spread and topped with a vulcanisable compounded rubber in order to impregnate the fabric and to provide the desired thickness of rubber on the surface. A covering sheet of vulcanisable rubber was then laid on the surface and the assembly subjected to pressure in a belting press heated by steam at 45 lbs. per square inch pressure for 15 minutes to consolidate the belting and vulcanise the rubber.

The full width vulcanised belting was then divided by cutting along the spaced portions which appeared as longitudinal channels across the width of the belting, running the length of the belting. The cut separated sections were joined at the ends in conventional manner by means of splicing and joining or with belting fasteners to form belts having closed edges suitable for use on drives having "shifters" or "forks" for fast and loose pulley control.

In another example a length of the belting fabric as before was spread with plasticised polyvinyl chloride paste to give the desired impregnation of the fabric and thickness of the material on the surface. Both surfaces of the belting were then covered with a sheet of calendered plasticised polyvinyl chloride and then the assembly heated in a belting press at a temperature equivalent to a steam pressure of 120 lbs. per square inch for 20 minutes to consolidate the belting.

The completed belting was divided by cutting as previously described and the separated sections were joined in known manner to form complete belts having closed and abrasion resistant edges.

Having now described our invention—what we claim is:

1. A divisible belting fabric comprising a plurality of longitudinal compound weave belting portions having weft threads in a plurality of planes, and a plurality of longitudinal dividing portions adapted for cutting longitudinally of the fabric to sever the weft threads and divide the fabric, at least two pairs of warp threads in each dividing portion, said pairs of warp threads being "leno" woven and twisted between adjacent weft threads to form loops and said weft threads passing through said loops in each of said pairs of warp threads.

2. A divisible belting fabric according to claim 1 in which the dividing portions include longitudinal portions with no warp threads to which "leno" warp threads are adjacent.

3. Divisible belting comprising a divisible belting fabric having a plurality of longitudinal compound weave belting portions having weft threads in a plurality of planes, and a plurality of longitudinal dividing portions adapted for cutting longitudinally of the fabric to sever the weft threads and divide the fabric, at least two pairs of warp threads in each dividing portion, said pairs of warp threads being "leno" woven and twisted between adjacent weft threads to form loops and said weft threads passing through said loops in each of said pairs of warp threads, impregnated and covered with an elastomeric material.

4. Belting having abrasion-resistant edges comprising a longitudinal compound weave belting portion having weft threads in a plurality of planes, at least one pair of "leno" woven warp threads in each longitudinal edge and twisted between adjacent weft threads to form loops, said weft threads passing through said loops in each of said pairs of warp threads in one plane, the belting portion and the warp threads being impregnated and covered with elastomeric material.

5. A method of making belting having abrasion-resistant edges comprising weaving a divisible low-stretch belting fabric having weft threads in a plurality of planes and a plurality of longitudinal dividing portions containing no warp threads, at least two separated pairs of warp threads at the sides of each dividing portion, the said pairs of warp threads being twisted between adjacent wefts in a leno weave and said weft threads passing through loops in each of said pairs of warp threads, tensioning the leno warp threads to draw together the weft threads from different planes, impregnating and covering the divisible belting fabric with an elastomer, heating the belting under pressure to consolidate the elastomer and dividing the belting by cutting so that each cut edge is adjacent to a pair of twisted leno woven warp threads.

6. Belting having abrasion resistant edges comprising longitudinal compound weave belting fabric having weft threads in a plurality of planes, at least one pair of leno woven warp threads twisted between adjacent weft threads in each longitudinal edge, said weft threads passing through loops in each of said pairs of warp threads in one plane, impregnated and covered with elastomeric material.

References Cited in the file of this patent

UNITED STATES PATENTS

| | | |
|---|---|---|
| 1,612,022 | Howarth | Dec. 28, 1926 |
| 2,533,996 | Clarkson | Dec. 12, 1950 |
| 2,672,168 | Walters | Mar. 16, 1954 |
| 2,672,169 | Walters | Mar. 16, 1954 |

FOREIGN PATENTS

| | | |
|---|---|---|
| 238,298 | Great Britain | Aug. 17, 1925 |